April 29, 1952   E. H. LEFTWICH   2,594,321
NUT HOLDER
Filed Dec. 1, 1947
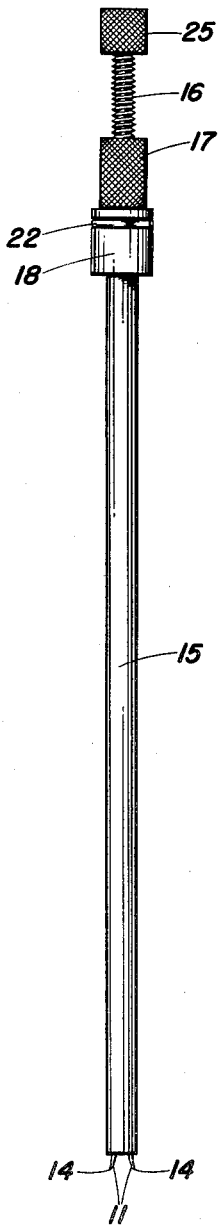
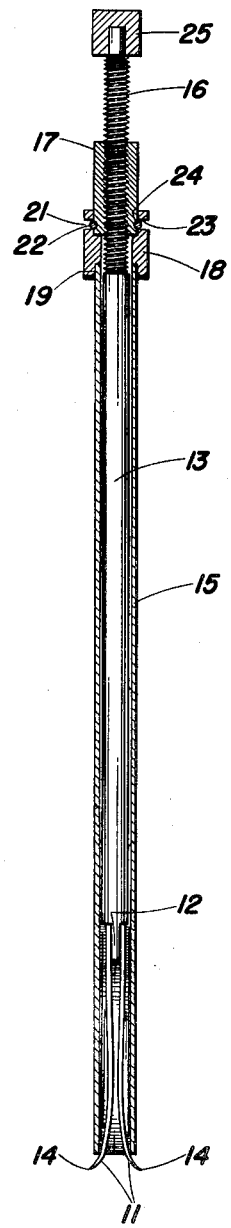
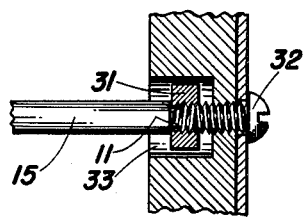
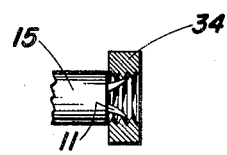
INVENTOR.
Edmund H. Leftwich
BY
Attorney Patented Apr. 29, 1952

2,594,321

UNITED STATES PATENT OFFICE 2,594,321

NUT HOLDER

Edmund H. Leftwich, San Diego, Calif., assignor of fifty per cent to John W. Wilhoit, Jr., Thirty-ninth Medical Group, A. P. O. 942, care of P. M., Seattle, Wash., and Richard M. Wilhoit, San Diego, Calif.

Application December 1, 1947, Serial No. 789,007

1 Claim. (Cl. 81—125)

(Granted under the act of March 3, 1883, as amended April 30, 1928; 370 O. G. 757)

This invention relates to holders for recessed objects and more particularly to a holder for positioning and starting a nut in a recess or other inaccessible region.

It is an object of this invention to provide a means for starting a nut on a screw when the end of the screw is in a relatively inaccessible region such as a narrow recess.

It is another object of this invention to provide such a holder as may be adjusted for application to various sized nuts.

While the instant invention is designed primarily to assist in starting a nut on the end of a screw, it will be readily understood that it is equally applicable to removing the nut from the screw, provided the nut is loose on the screw.

In the servicing of relatively small equipment, such as radio equipment, the human hand and fingers constitute overly large means for manipulating various parts which must be secured together or adjusted. A particular problem of this category is the starting of a nut on the end of a screw in a remote and relatively inaccessible region of a radio chassis. The problem is aggravated in those cases where the end of the screw is so confined or recessed that there is only room to apply a nut to the end of the screw and to apply a thin walled tubular wrench over the nut to tighten it. Once the screw is started, it is a simple matter to tighten it with a wrench, but the recess in which the end of the screw is disposed may be so confining that there is no room to provide even mechanical clasping around the outside of the nut, much less to clasp the nut with human fingers.

It is accordingly a further object of this invention to provide a holder for starting a nut which clasps the nut internally by the threads rather than externally.

In accordance with this invention there is provided a plurality of elongate, spring-like legs disposed parallel to each other and biased outwardly of each other at one end by the natural springiness of the legs. Outwardly pointed toes are provided or formed at the end of each leg for internally engaging the threads of a nut, whereby the nut may be started on a screw in any space, no matter how confined, so long as there is room enough for the nut to rotate. The legs are mounted within a tube or sheath with the toed ends protruding, the tube tending to radially confine the legs in accordance with the extent of protrusion thereof. Means are provided for axially adjusting the legs within the tube so that by varying the extent of protrusion of the legs, the diametral spacing between the toes may be varied to accommodate various sized nuts.

One embodiment of the invention has been illustrated in the drawing, wherein:

Fig. 1 is a side view;

Fig. 2 is a longitudinally sectioned view similar to Fig. 1;

Fig. 3 is a fragmentary detail illustrating the starting of a nut on a screw by the use of the instant invention; and Fig. 4 is a fragmentary detail illustrating the legs in extended position for holding a nut of relatively large size.

Referring to the drawing and particularly to Fig. 2, 11 designates a pair of springy elongate legs, the unstressed position of which is such that their outer ends diverge. At their inner ends the legs are secured to the end 12 of a rod 13. At their outer ends the legs 11 are provided with outwardly directed, pointed toes 14.

The assembly thus far described, consisting of legs 11 and rod 12, is surrounded by a sheath or tube 15, the toed ends of the legs 11 being allowed to protrude from the lower end of the tube. The divergence of the protruding ends of the legs 11 is greater than the internal diameter of the tube 15, so that the latter tends to radially confine the ends of the legs 11, the degree of confinement depending on the amount of withdrawal of the legs into the tube. From the description thus far, it will be manifest that the diametral spacing between the pointed toes 14 may be adjusted by axially adjusting the legs 11 within the tube 15, thereby to determine the extent of confinement imposed by the end of the tube 15 on the divergence of the legs 11.

Such axial movement of the legs 11 is provided by threading the rod 13 at 16, thereby to provide a lead screw threadedly engaged by a lead nut 17 which is rotatably mounted in a collar 18, fixedly secured at 19 to the upper end of the tube 15. Rotation of the lead nut 17 in the collar 18 is permitted, while axial movement is restrained, by providing a groove 21 circumferentially around the collar 18, in which is mounted a flat sided spring clasp or ring 22. Diametrically opposed portions of the groove 21 extend completely through the wall of the collar 18 as shown at 23, thereby permitting the flat or straight portions of the clasp 22 to rest in a circumferential groove 24 formed near the lower edge of the lead nut 17.

It will be seen that when the lead nut 17 is rotated in the collar 18, and the lead screw 16 formed on the end of rod 13 is restrained from rotation, the legs 11 will move in and out of the tube 15, thereby varying the diametral spacing between the toes 14. In practical operation, friction between the diverging legs 11 and the edge of the tube 15 is sufficient to substantially restrain the lead screw 16 from rotating with the lead nut 17. If desired, a knurled cap 25 may be affixed on the end of the lead screw 16 to provide a clasping surface for assuring relative rotation between the lead nut 17 and the lead screw 16.

Use of the instant invention will be described with reference to Fig. 3. The axial position of legs 11 within the tube 15 is first adjusted until the diametral span between the toes 14 is slightly greater than the thread diameter of the nut 31 which is to be threaded to a screw 32. The nut is then pressed over the toes 14, the springiness of the legs 11 pressing the toes radially outward into engagement with the threads of the nut. The nut rests against the edge of the tube 15 as shown in Fig. 3. The nut 31 may be then started upon the screw 32 even though the latter be disposed in a very confining recess 33. When the nut 31 is sufficiently well started, the holder is simply pulled out of the threads and a tubular wrench is inserted over the nut to continue the securing thereof to the screw 32 and to tighten it in position. In some cases the confinement of the nut is such that even a tubular wrench cannot be used, whereupon a screw driver blade is wedged against one of the flats of the nut while the screw is turned from the other side by a screw driver. Fig. 4 illustrates the legs 11 in relatively extended position to receive a nut 34 having a large thread diameter.

From the above description it will be seen that there has been disclosed a nut holder by means of which a nut may be started on a screw located in a recess so confining that an externally applied holding means, i. e. one engaging the outer surface of the nut could not possibly be used.

It will be understood that this invention may be designed and utilized in any suitable shape, size or arrangement, depending upon the objects to be accomplished, and that various modifications and changes may be made in this invention without departing from the spirit and scope thereof as set forth in the appended claim.

The invention described herein may be manufactured and used by or for the Government of the United States of America for governmental purposes without the payment of any royalties thereon or therefor.

What is claimed is:

A nut holder comprising a tube, a lead nut, swivel means rotatably mounting said lead nut at one end of said tube coaxially therewith, said means comprising a collar fixed to the end of said tube and having a recess rotatably receiving said lead nut, and spring retaining means between said lead nut and collar, a lead screw threaded to said lead nut and extending into said tube, handle means in the form of a cap fixed to the end of the lead screw so that the lead screw can be held against rotation with respect to said tube, a pair of spring legs forming an extension of said screw, said legs normally diverging outwardly at their lower portions in a continuous outward curvature and being restrained inwardly by said tube and protruding from the other end of said tube, and including outwardly directed toes constituting the protruding ends of said legs engageable with the internal threads of a nut to hold the nut in position, said lead nut, when rotated relative to said lead screw, serving to extend or retract said legs and thereby determine the diametral span between said toes for engagement within various sized nuts.

EDWIN H. LEFTWICH.

REFERENCES CITED

The following references are of record in the file of this patent:

UNITED STATES PATENTS

| Number | Name | Date |
|---|---|---|
| 493,815 | Bingham | Mar. 21, 1893 |
| 712,239 | Barrett | Oct. 28, 1902 |
| 851,181 | McMurtry | Apr. 23, 1907 |
| 957,760 | Fray | May 10, 1910 |
| 987,173 | Sale | Mar. 21, 1911 |
| 1,008,018 | Cunningham | Nov. 7, 1911 |
| 1,756,003 | North | Apr. 22, 1930 |
| 2,264,573 | Johnson et al. | Dec. 2, 1941 |
| 2,502,025 | Raup | Mar. 28, 1950 |